US010942019B2

(12) United States Patent
Stoltz et al.

(10) Patent No.: US 10,942,019 B2
(45) Date of Patent: Mar. 9, 2021

(54) FITTING SQUARE

(71) Applicants: Clayton Stoltz, Abbotsford (CA);
Brian McGlashan, Port Moody (CA)

(72) Inventors: Clayton Stoltz, Abbotsford (CA);
Brian McGlashan, Port Moody (CA)

(*) Notice: Subject to any disclaimer, the term of this patent is extended or adjusted under 35 U.S.C. 154(b) by 270 days.

(21) Appl. No.: 16/251,427

(22) Filed: Jan. 18, 2019

(65) Prior Publication Data
US 2020/0232776 A1 Jul. 23, 2020

(51) Int. Cl.
*G01B 3/14* (2006.01)
*G01B 3/56* (2006.01)
*G01B 3/02* (2020.01)

(52) U.S. Cl.
CPC .............. *G01B 3/566* (2013.01); *G01B 3/02* (2013.01)

(58) Field of Classification Search
CPC . G01L 35/566; G01L 3/04; G01L 3/14; G01L 3/56
USPC ......... 33/412, 429, 474, 476, 482, 529, 562, 33/563, 565, 566, 1 G, 1 BB, 21.3
See application file for complete search history.

(56) References Cited

U.S. PATENT DOCUMENTS

| | | | | |
|---|---|---|---|---|
| 842,742 A * | 1/1907 | Young | ................... | B43L 13/201 33/563 |
| 1,139,229 A * | 5/1915 | Requa | ................... | B43L 7/0275 33/476 |
| 2,058,330 A * | 10/1936 | Little | ................... | B43L 7/12 33/343 |
| D140,152 S * | 1/1945 | Aichele | ................... | D10/62 |
| 4,712,307 A * | 12/1987 | Kish | ................... | G01B 3/56 33/421 |
| 4,930,225 A * | 6/1990 | Phillips | ................... | B25H 7/00 33/526 |
| 4,945,649 A * | 8/1990 | Parker | ................... | G01B 3/56 33/199 R |
| 7,627,955 B1 * | 12/2009 | Perkey | ................... | B43L 7/14 33/427 |
| 2006/0196072 A1 * | 9/2006 | Lewis | ................... | G01B 3/566 33/760 |
| 2007/0245581 A1 * | 10/2007 | Hios | ................... | G01C 9/18 33/429 |
| 2020/0307300 A1 * | 10/2020 | Logan | ................... | B43L 7/12 |

FOREIGN PATENT DOCUMENTS

WO    WO-2017122160 A1 *   7/2017    ............. G01B 3/566

* cited by examiner

*Primary Examiner* — Christopher W Fulton
(74) *Attorney, Agent, or Firm* — David W Barman

(57) ABSTRACT

A fitting or measuring square with measuring indicia configured with a primary rectangular form and triangle collinear with one side of the primary rectangle and a secondary rectangle partially collinear with the triangle whereby the measuring square is provided with multi function indicia.

3 Claims, 10 Drawing Sheets

FITTING SQUARE

BACKGROUND OF THE INVENTION

A skilled builder and craftsman is constantly looking for tools and devices to increase their efficiency. There is an area lacking amongst such devices. There is no single device provided to quickly and efficiently provide those involved in pipework and ductwork installation. The present invention addresses this need.

SUMMARY OF THE INVENTION

The fitting square is a unique way for plumbers and other tradesman to quickly and efficiently layout pipe and ductwork installations without needing to do the tedious math involved in doing so. From drainage pipe and water pipe to heating and refrigeration the Fitting Square shows the beginner and the expert where to strike lines which can then be measured between those strikes and have perfectly fitted pipe that looks clean and professional no matter what level the apprentice or journeyman.

While the Fitting Square eliminates the need to use manufacturers specification sheets for everyday use fittings it in turn saves time and money decreasing "on the job" layout time and allows the tradesman to perform layouts in more opportune time frames such as formwork concrete layouts or "deck" work to vertical wall installs that involve attached or running pipe along them and up.

When used correctly the Fitting Square can essentially assist all of installers in providing a well planned professional looking installation at a faster delivery rate than those without it. It does this by allowing you to plan hangers and clamps that support the pipe work.

It's light, durable and easy to use with all the angles needed to install pipe of all sizes.

Each unit weighs less than 10 oz. and has handy finger holes and loops to easily hang it on your tool belt and it easily fits in most tool bags and pouches.

DETAILED DESCRIPTION OF THE PREFERRED EMBODIMENT

Figure 1:
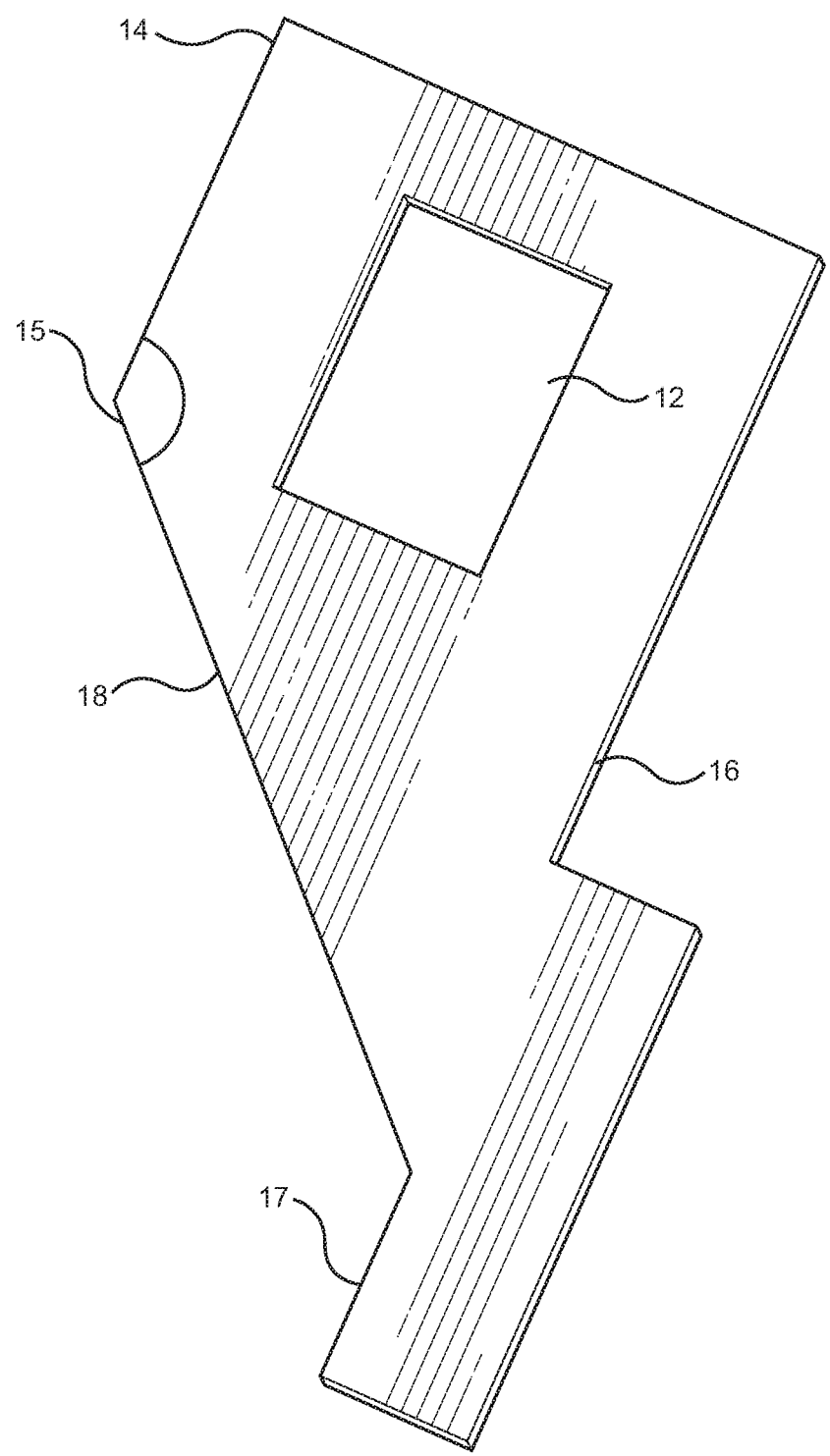
FIG. 1 is a top plan view according to one embodiment of the present invention.
Figure 2:
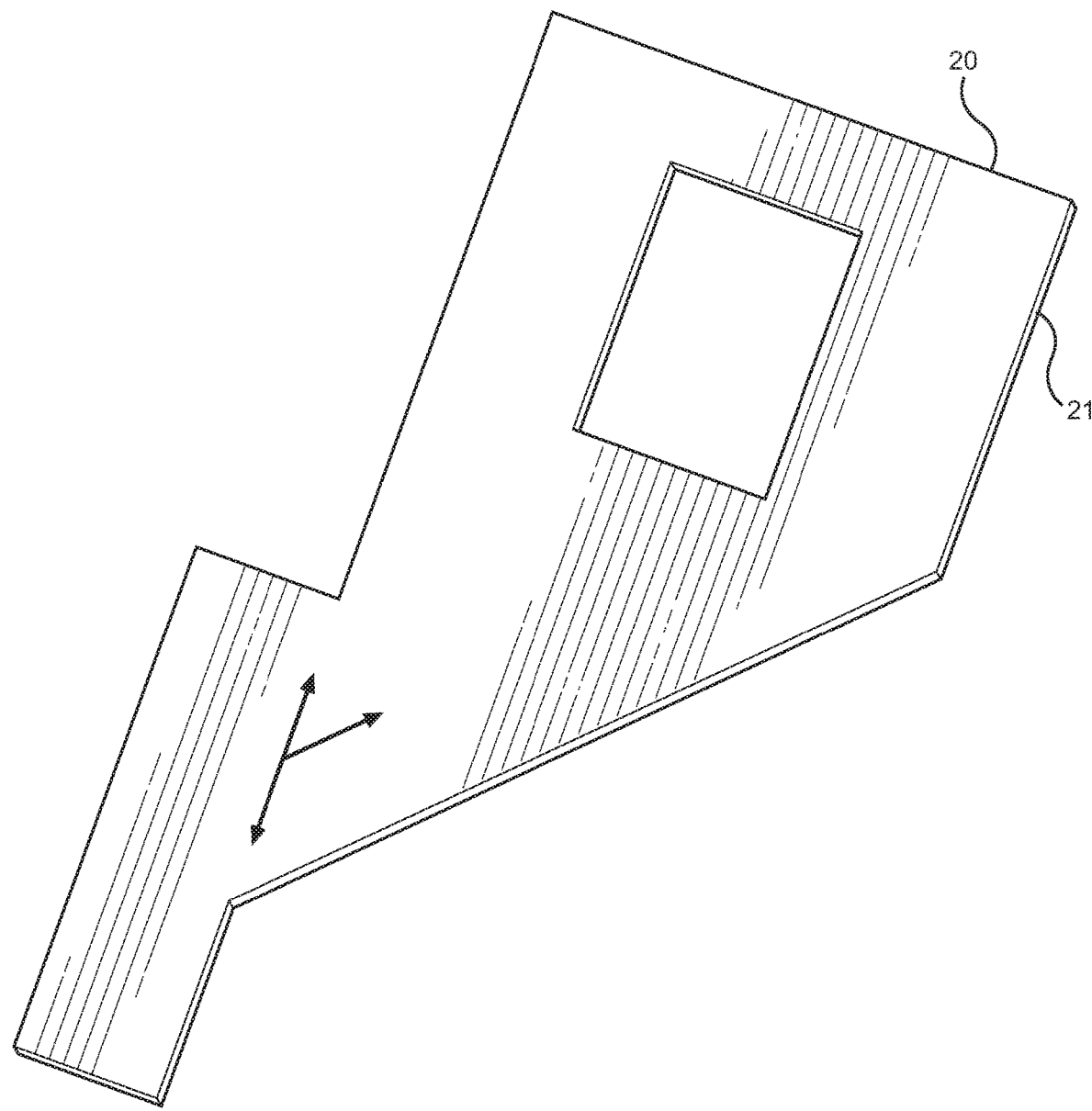
FIG. 2 is a bottom plan view according to embodiment of the present invention.
Figure 4:
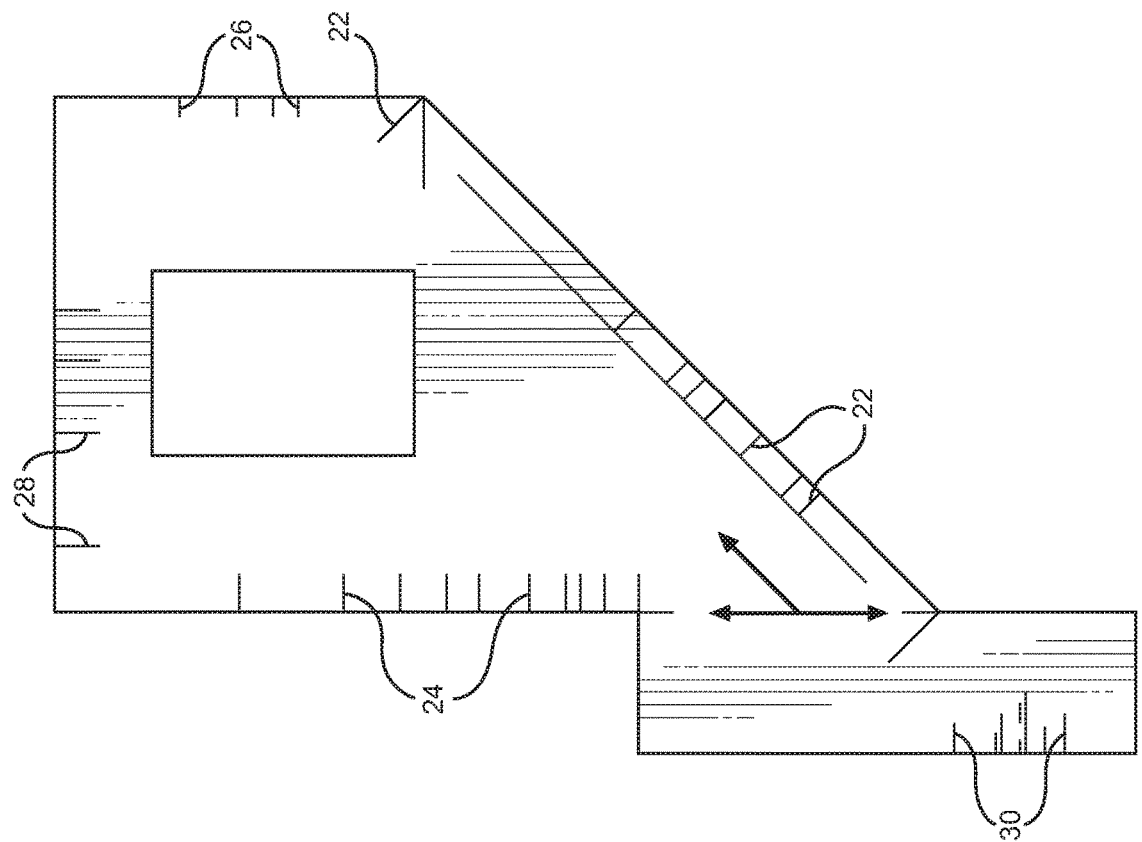
FIG. 4 is a top plan view of one embodiment of the present invention.
Figure 3:
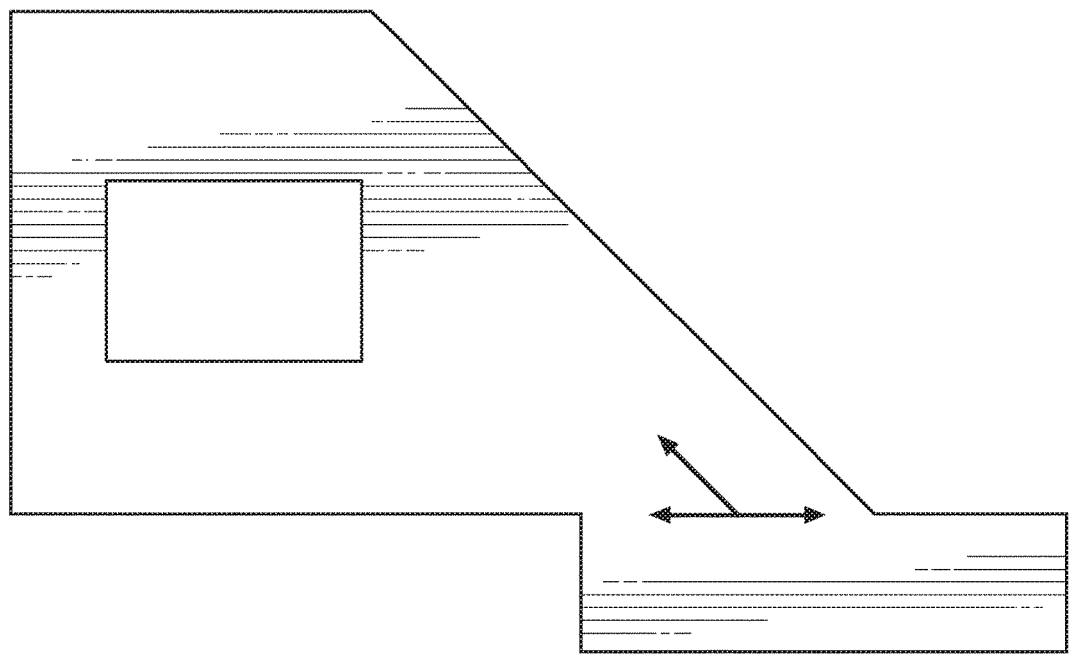
FIG. 3 is a top plan view of one embodiment of the present invention.
Figure 5:
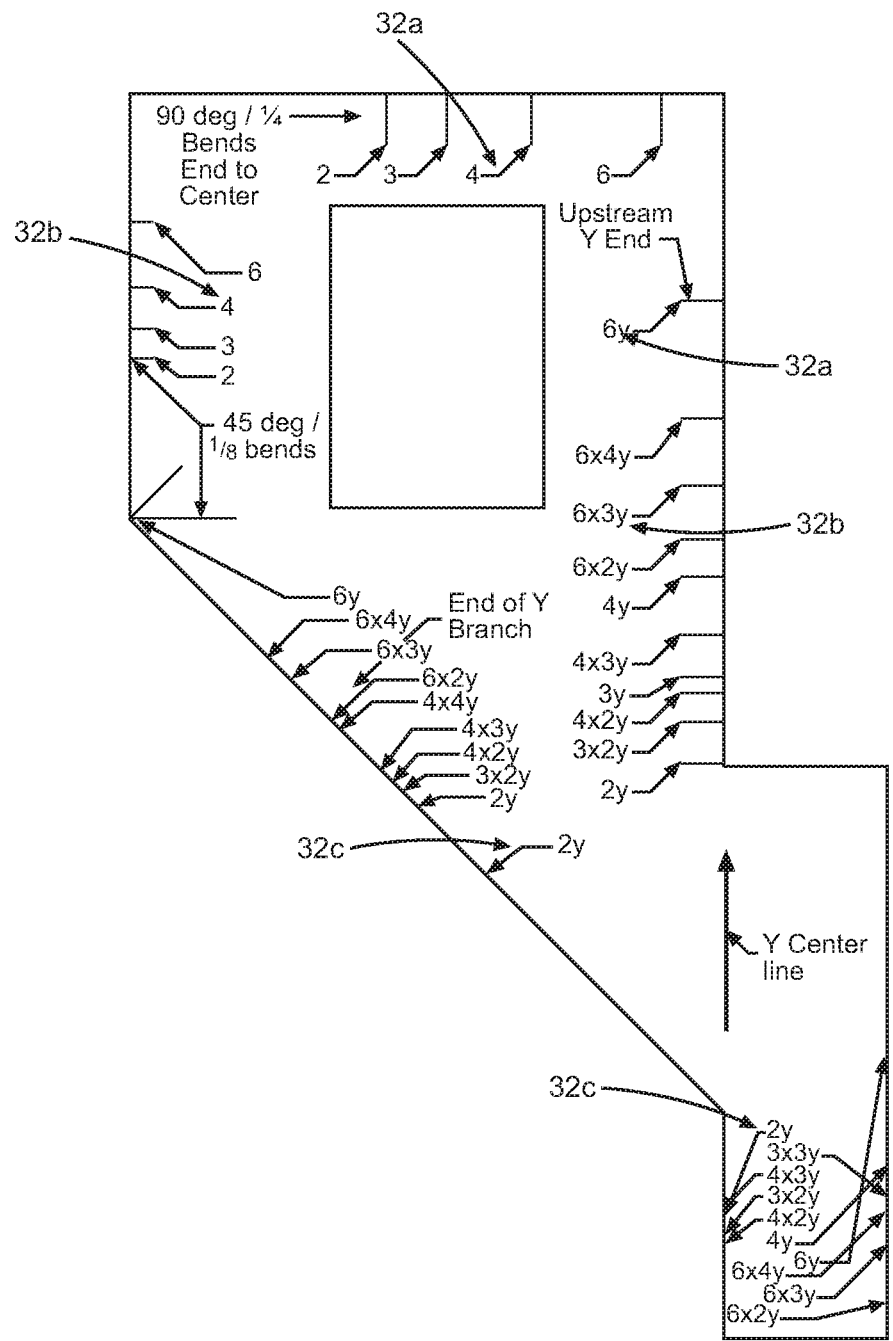
FIG. 5 is a top plan view demonstrative of measurement and indication features according embodiment of the present invention.
Figure 5A:
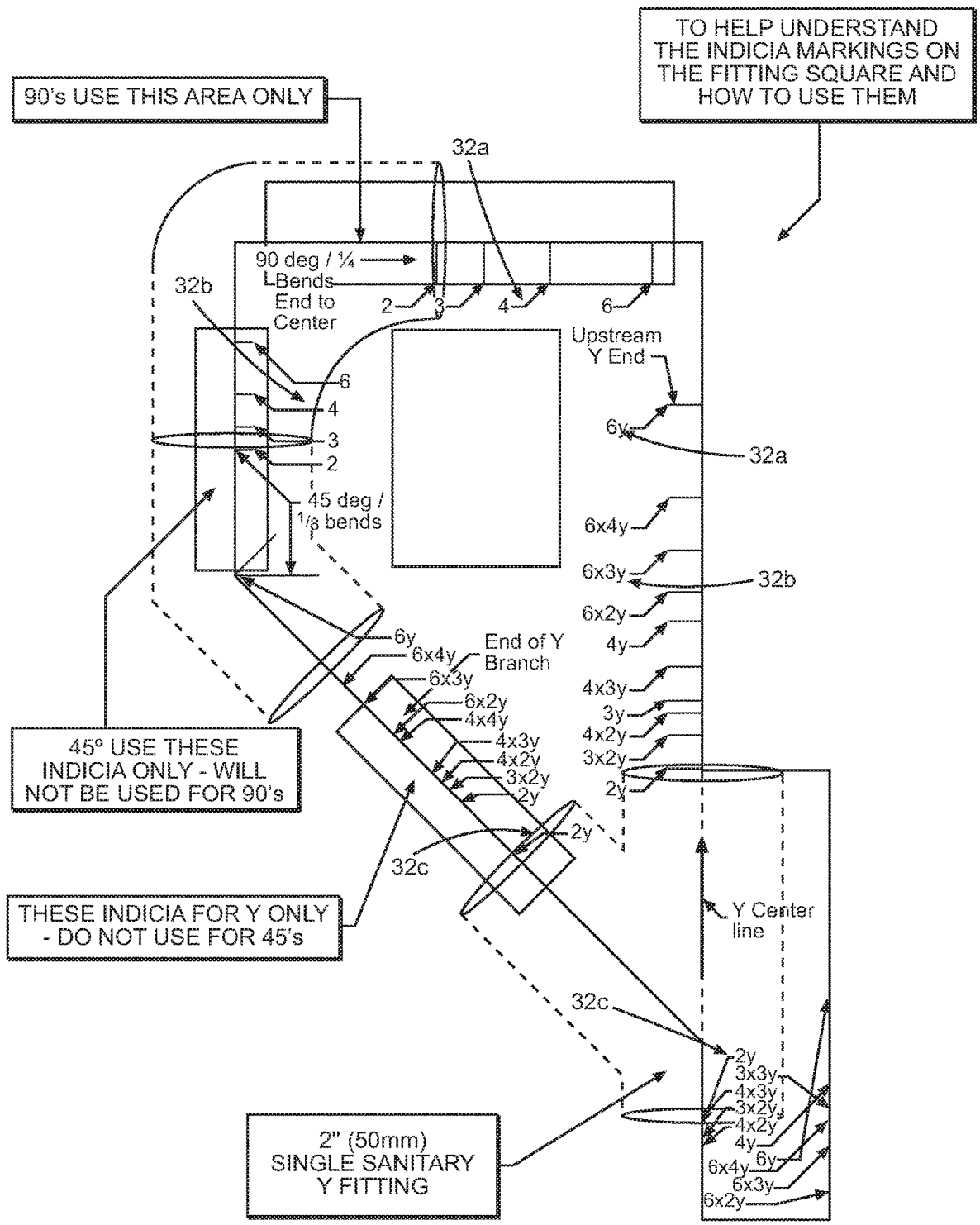
FIG. 5A is a top plan view demonstrative of measurement and indication features according to embodiment of the present invention.
Figure 5B:
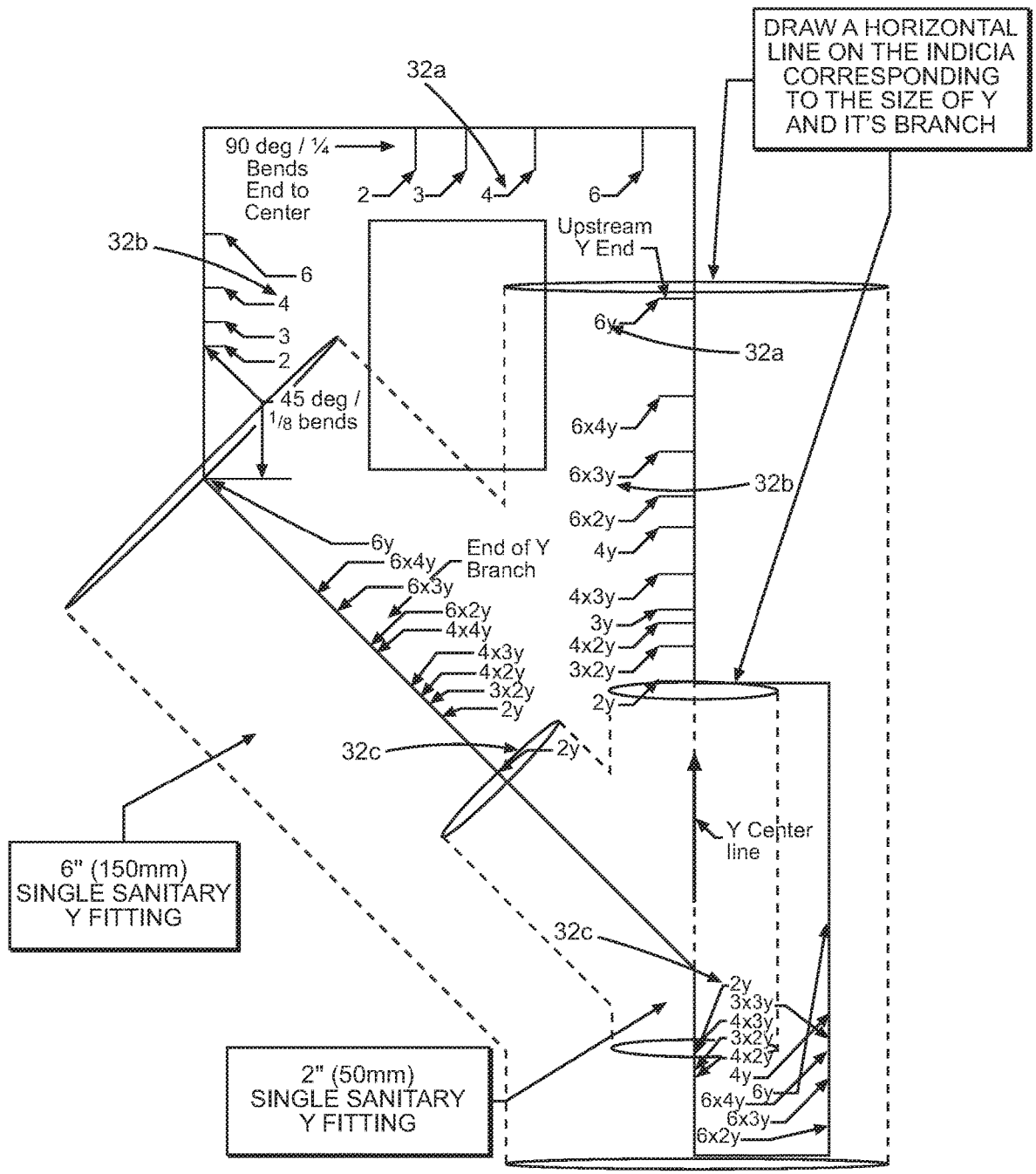
FIG. 5B is a top plan view demonstrative of measurement and indication features according to embodiment of the present invention.
Figure 5C:
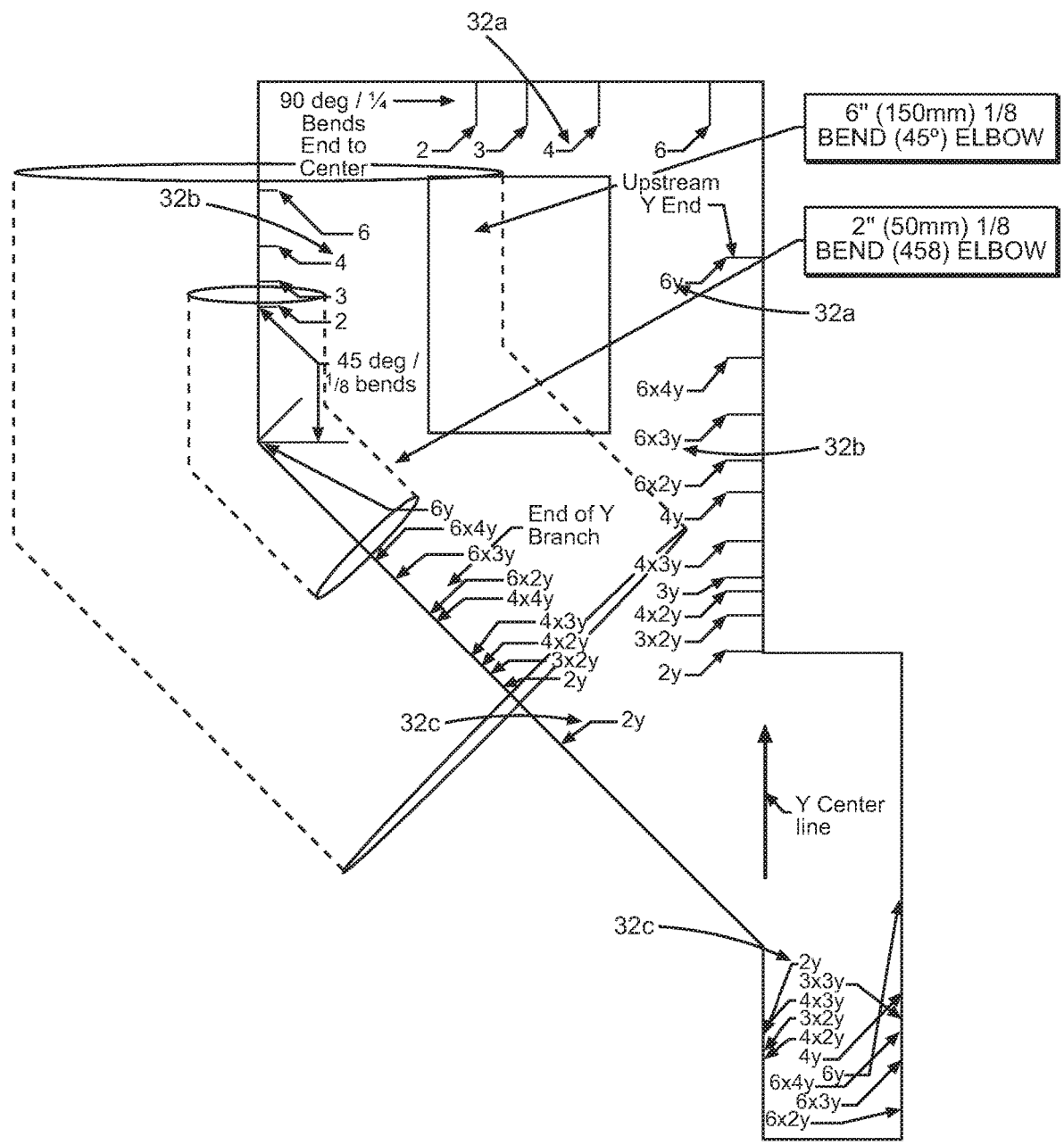
FIG. 5C is a top plan view demonstrative of measurement and indication features according to embodiment of the present invention.
Figure 5D:
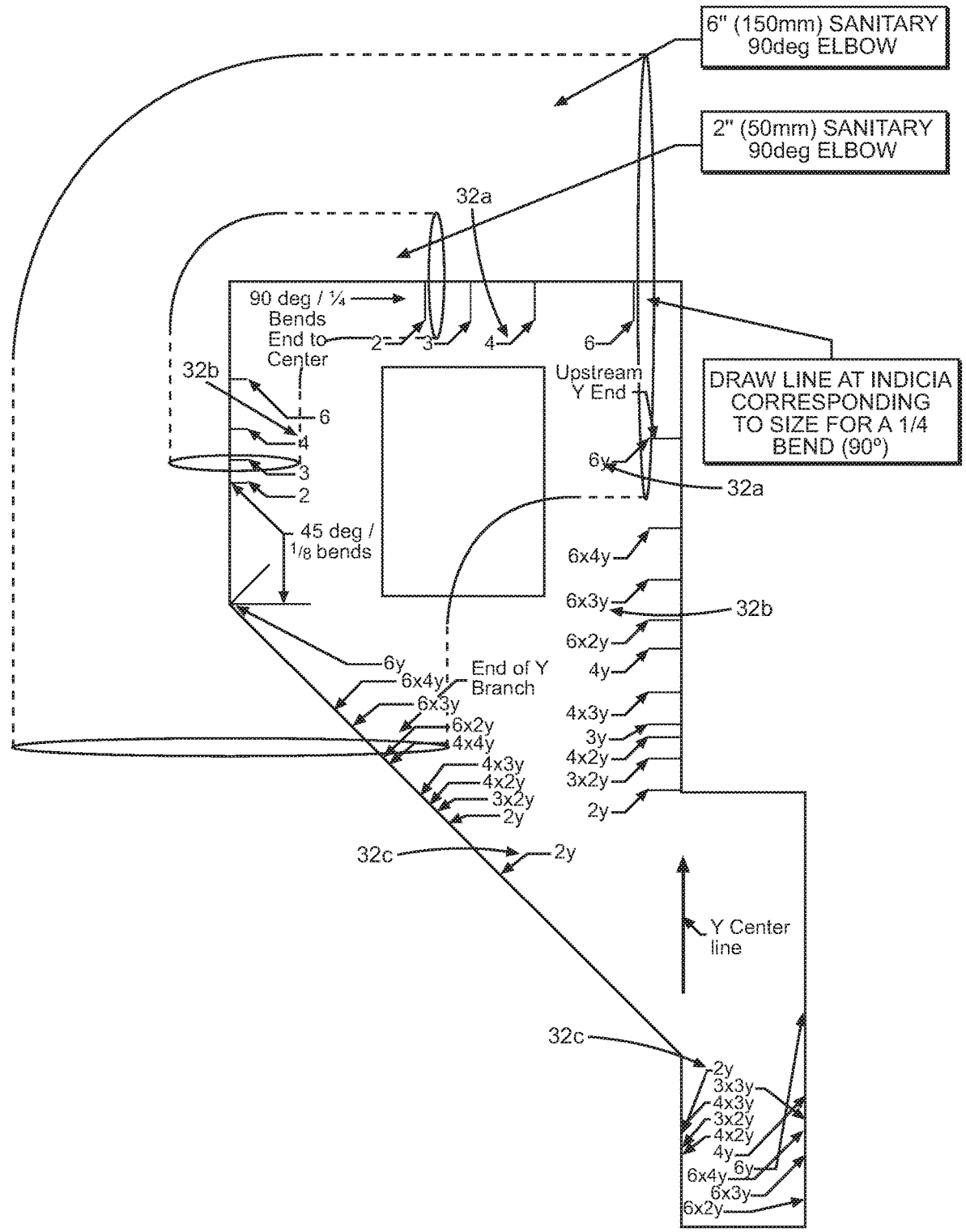
FIG. 5D is a top plan view demonstrative of measurement and indication features according to embodiment of the present invention.
Figure 6:
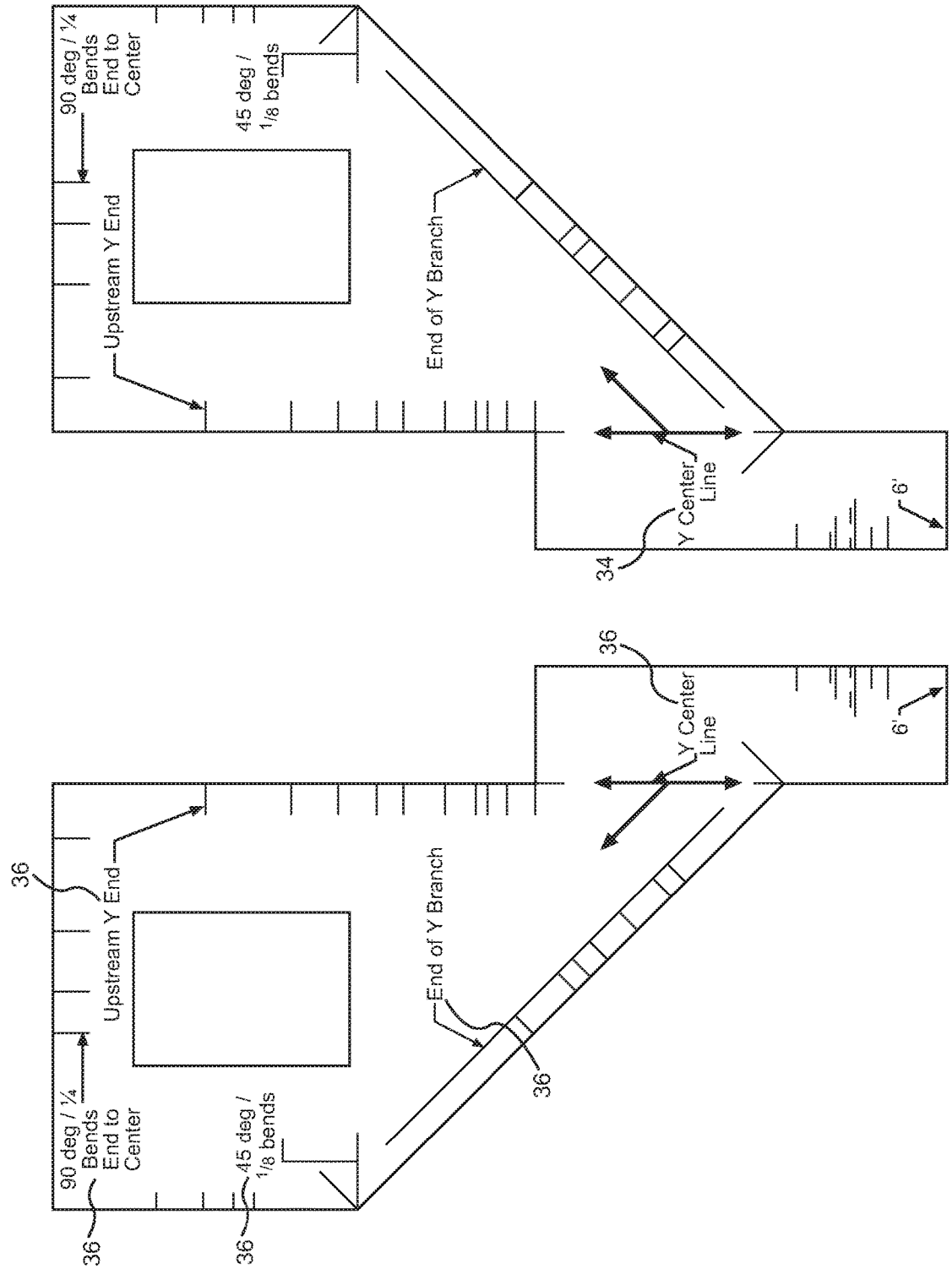
FIG. 6 are top and bottom plan views with measuring indicia according to one embodiment of the present invention.
Figure 7:
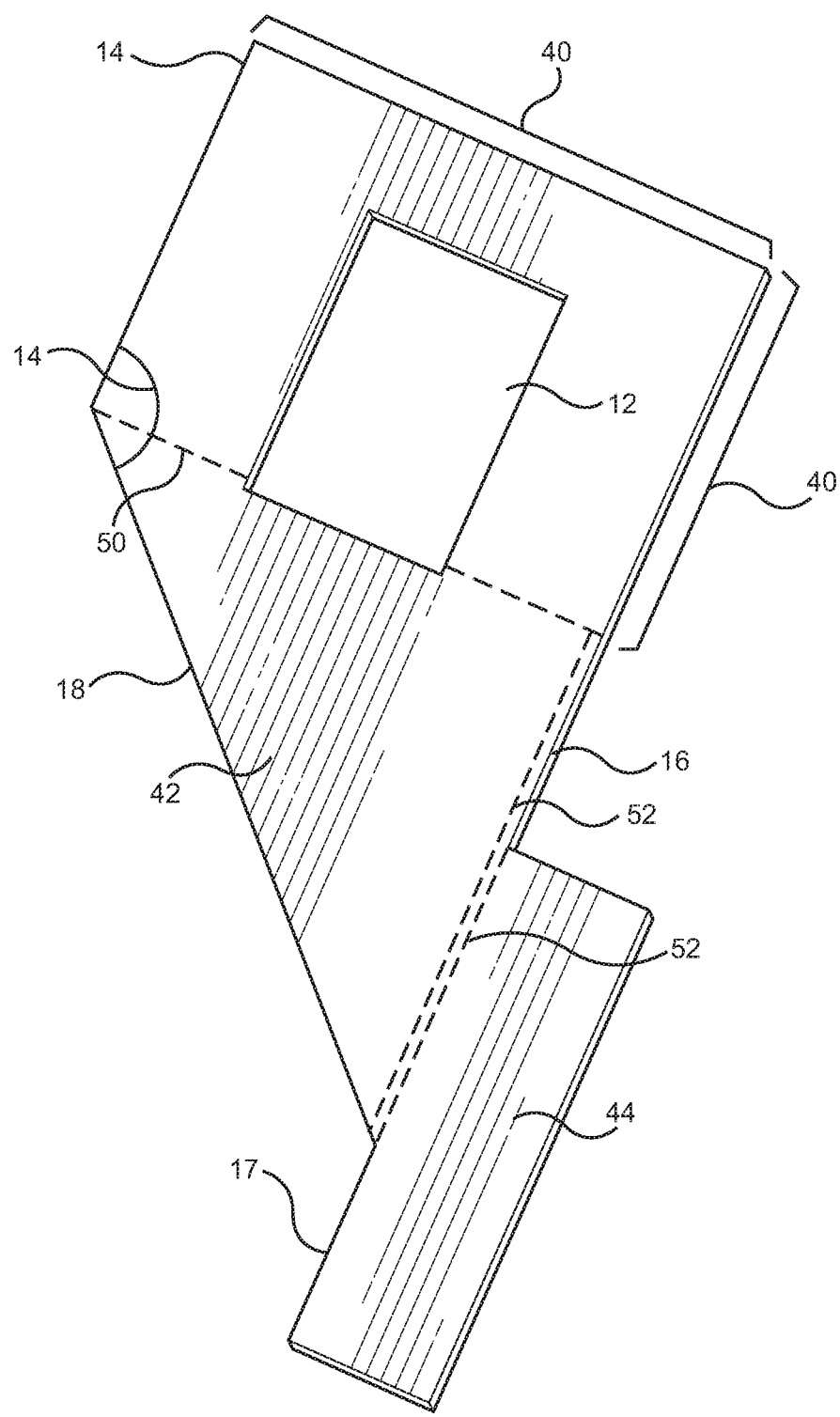
FIG. 7 is a top plan view demonstrative of measurement and indication features according to one embodiment of the present invention.

As generally understood the present invention is a fitting square that is substantially planar and configured as demonstrated in the drawings. The fitting Square has a centrally placed cavity 12 providing for not only holding the square while in use but for use in hanging the device for storage and transport. Each complementary centerline edge 14 is constructed and arranged in order to precisely ascertain a 45° angle. Complimentary edges 16 and 17 are used to draw a centerline of a straight through or trunk part of a Y fitting in order to mark the measurements. Branch edge 18 is constructed and arranged to draw a centerline of a branch in order to mark the desired measurements. First right angle edge 20 and second right angle edge 21 are arranged to draw centerline of a 90° fitting. They are constructed and arranged with indicia as provided. Indicia 22 are instrumental markings providing for measurements of a Y fitting branch. Indicia 24 provide incremental markings utilized in a wide fitting trunk. Indicia 26 are incremental markings of a 45° fitting. Indicia 28 are incremental markings providing for measurement of a 90° fitting. Indicia 30 are incremental markings of the bottom of a Y fitting. Each of indicia 32A, 32B, and 32C provide for indicia better label markings for the type of increment and relative to the fitting they represent. Indicia 34 are orientation labels that provide the user at a glance guidance relating to the orientation of using the fitting Square. Indicia 36 are fitting labels that provide the user information relating to which edge should be used and what measurements should be used for a respective fitting.

The overall configuration provides for a main first rectangle 40 a triangle shape portion 42 sharing edge 50 with said main rectangle 40 and a secondary rectangle 44 sharing a portion of edge 52 with triangle 42.

Triangle 42 is a 45-45-90 right triangle. In one embodiment there is a desired correlation between rectangle 44 and edge 16 of triangle 42 in that these are relative to fittings that are marked on these areas which when drawn represent a "Y" fitting, That is to say side 52, which is congruent to side 50 would be the center line of a "Y" fitting and when edge 18 is traced to edge 16 that gives the user a 45 degree angle of the branch portion of the "Y" fitting as all fittings are based on 90 deg 45 deg and 22.5 dig angles.

Although the specifics in the figures demonstrate rectangle 44 having edge 17 the same length as edge 16 of the triangle, this is only a single embodiment. This rectangle 44 would change based on the type of fittings used and which manufacturer's fittings we create the squares for. This iteration is for Sanitary/Drainage fittings manufactured for North America by North American manufacturers of Sanitary/Drainage fittings. This rectangle would change for European fittings or Chinese fittings While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

What is claimed:

1. A fitting square comprising:
   a planer unitary body;
   a primary rectangle portion forming part of said unitary body, whereby said primary rectangle includes a central cavity;
   a triangle portion forming part of said unitary body whereby a first leg of said triangle shares an edge with said primary rectangle; and
   a secondary rectangle portion sharing at least a portion of a second leg of said triangle portion; and
   measuring indicia deposed on at least one surface of said fitting square.

2. The fitting square of claim 1, wherein said triangle portion is a right triangle.

3. The fitting square of claim 1, wherein said triangle portion is a 45-45-90 right triangle.

* * * * *